US006979163B2

(12) United States Patent
Brletich et al.

(10) Patent No.: US 6,979,163 B2
(45) Date of Patent: Dec. 27, 2005

(54) PUSH-IN REMOVABLE FASTENER

(75) Inventors: Michael F. Brletich, Lake Forest, IL (US); Joseph Janisch, Jr., Roselle, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/263,411

(22) Filed: Oct. 2, 2002

(65) Prior Publication Data

US 2003/0082026 A1 May 1, 2003

Related U.S. Application Data

(60) Provisional application No. 60/327,491, filed on Oct. 5, 2001.

(51) Int. Cl.[7] .............................................. F16B 35/04
(52) U.S. Cl. ........................ 411/418; 411/508; 411/424
(58) Field of Search ........................ 411/417, 418, 310, 411/311, 970, 999, 508, 913, 424, 408; 24/297

(56) References Cited

U.S. PATENT DOCUMENTS

| | | | | |
|---|---|---|---|---|
| D24,855 S | | 11/1895 | Trapp | |
| D31,416 S | | 8/1899 | Gilson | |
| D33,313 S | | 10/1900 | Bolens | |
| 1,131,085 A | * | 3/1915 | Reilly | 411/334 |
| D52,511 S | | 10/1918 | Groh | |
| D106,861 S | | 11/1937 | Dellinger | |
| 2,409,638 A | | 10/1946 | Lyon | |
| 2,909,957 A | | 10/1959 | Papata | |
| 2,913,031 A | | 11/1959 | McKay et al. | |
| 3,079,968 A | | 3/1963 | Buckley | |
| 3,176,746 A | * | 4/1965 | Walton | 411/259 |
| 3,189,075 A | | 6/1965 | Jobe | |
| 3,384,141 A | | 5/1968 | Kost | |
| D224,507 S | | 8/1972 | Raynor et al. | |
| D225,209 S | | 11/1972 | Raynor et al. | |
| 3,810,279 A | | 5/1974 | Swick et al. | |
| 4,003,287 A | * | 1/1977 | Ziaylek, Jr. | 411/418 |
| D260,525 S | | 9/1981 | Lassiter | |
| 4,392,278 A | | 7/1983 | Mugglestone | |
| 4,396,329 A | | 8/1983 | Wollar | |
| D273,984 S | | 5/1984 | Vlock | |
| 4,776,739 A | * | 10/1988 | Hamman | 411/510 |
| 4,810,145 A | * | 3/1989 | Villas | 411/206 |
| 4,861,197 A | | 8/1989 | Calandra, Jr. | |
| 4,900,210 A | * | 2/1990 | Buchanan et al. | 411/508 |
| 4,938,645 A | | 7/1990 | Wollar | |
| 5,039,267 A | | 8/1991 | Wollar | |
| 5,110,245 A | * | 5/1992 | Hiroyuki | 411/421 |
| D326,809 S | | 6/1992 | Paul | |
| 5,306,098 A | * | 4/1994 | Lewis | 411/510 |
| 5,370,646 A | * | 12/1994 | Reese et al. | 606/72 |
| 5,407,312 A | | 4/1995 | Terrizzi | |
| 5,468,108 A | | 11/1995 | Sullivan et al. | |

(Continued)

*Primary Examiner*—William L. Miller
(74) *Attorney, Agent, or Firm*—Mark W. Croll; Paul F. Donovan

(57) ABSTRACT

A plastic push-in or drive fastener having a enlarged head and a shank is disclosed. The fastener is configured to allow the shank to be pushed through a complementary shaped aperture or opening in an article using a relatively low insertion force. A helical screw or rib formation on the fastener shank provides a retention force opposing the fastener from being axially withdrawn from the article while readily permitting withdrawal of the fastener from the article in response to rotation of the fastener about its axis. Moreover, the fastener shank is configured to prevent inadvertent separation of the fastener from the article through which it passes.

20 Claims, 2 Drawing Sheets

U.S. PATENT DOCUMENTS 5,551,817 A * 9/1996 Kanie ......................... 411/107
5,907,891 A 6/1999 Meyer
5,947,668 A 9/1999 Thommes
5,967,725 A * 10/1999 Voges ......................... 411/386
5,984,927 A * 11/1999 Wenstrom et al. ............ 606/72
6,170,858 B1 * 1/2001 Berger ..................... 280/728.2

* cited by examiner

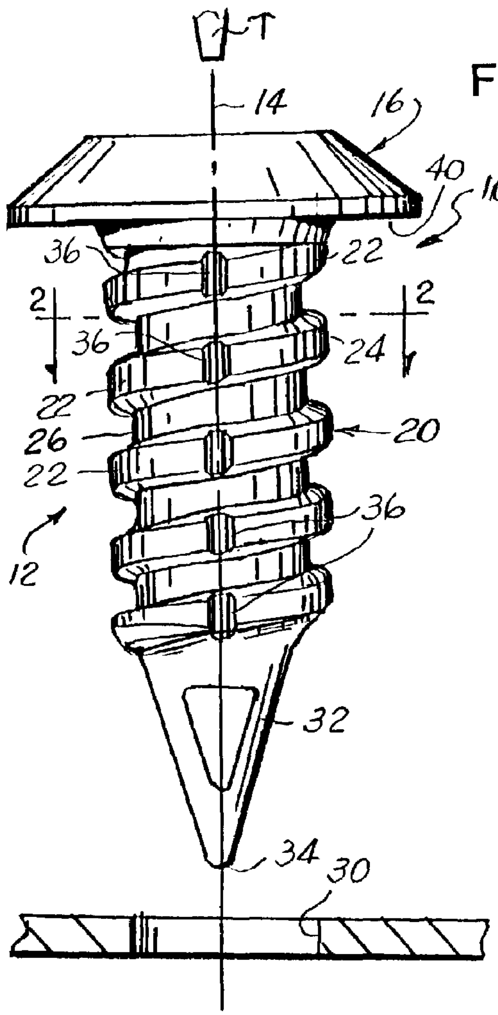
FIG. 1
FIG. 4
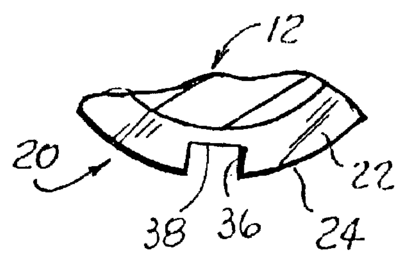
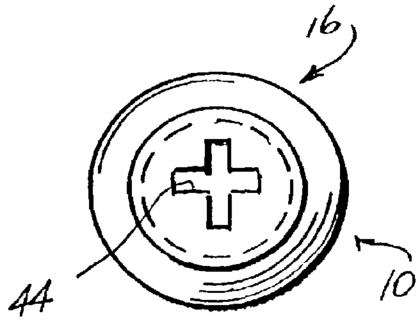
FIG. 5
FIG. 3
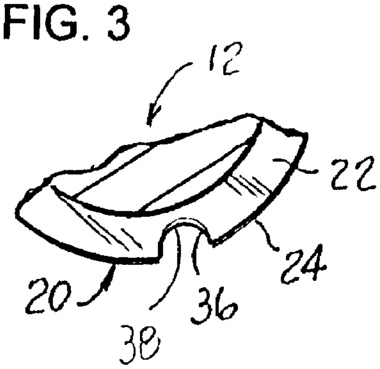
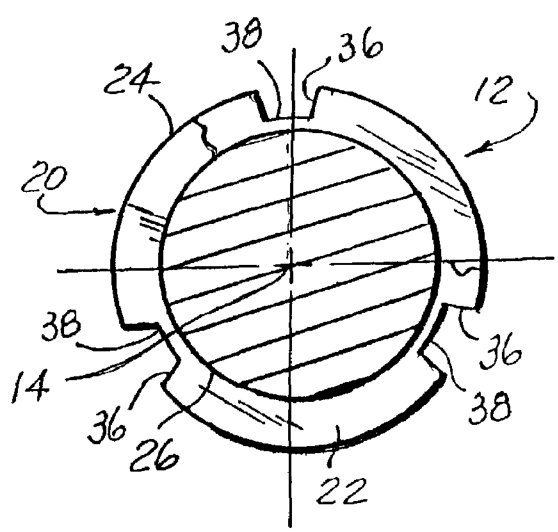
FIG. 2

PUSH-IN REMOVABLE FASTENER

CROSS REFERENCE TO RELATED APPLICATION

This application claims benefit of provisional patent application Ser. No. 60/327,491, filed Oct. 5, 2001.

FIELD OF THE INVENTION

The present invention generally relates to the fastener art, and more particularly, to a fastener of the type generally referred to as a "push-in" or "drive" fastener but which is rotatably removable so as to permit the fastener to be reused.

BACKGROUND OF THE INVENTION

"Push-in" or "drive" fasteners of a variety of types and styles are well known in the fastener art. Typically, such fasteners have a shank with series of vertically spaced flexible tabs or wing-like members extending away from an axis of the fastener. As such, fasteners of this variety are also referred to as tree fasteners.

Such fasteners are driven axially into preformed openings or holes in a workpiece article with the flexible tabs or wings-like members engaging the article and flexing as they move through opening or hole in the article The workpiece article into which the fastener is introduced or inserted may be a panel of a shipping container of a particular type, with the fastener being used to secure another panel, i.e., nameplate, strip of molding, or the like to such container.

The flexible tabs or wing-like members on the shank of the fastener are specifically designed such that the force required to install or push the fastener through the hole or opening is relatively low thereby facilitating ergonomic considerations. Ideally, it is desirable in many situations to further design the fastener such that the force required to remove the fastener from the hole is relatively high. The relatively high retention force securely holds the article or nameplate to the shipping container during transport and other rough handling conditions.

A problem arises, however, when the nameplate or article held by the fastener is to be removed from the container. Since conventional tree fasteners are typically designed to exert high retention force following their insertion, extensive efforts are often required when the nameplate or article held by the fastener is to be removed. As will be appreciated, such extensive efforts at replacing the nameplate or the like is not conducive to repetitive use of such containers along with required timely turn around of the product stored and transported therewithin Accordingly, the nameplate or article held by the fastener is typically torn or pulled from the container often resulting in destruction of the nameplate, container, or both, as well as destruction of the fastener. Of course, requiring a new or replacement nameplate adds to the transportation costs of the product. Moreover, when the nameplate or article is torn from the container, such action frequently results with the fastener head being broken off from the shank. Thus, when the new nameplate is to be attached to the container, the remaining shank of the broken fastener must be drilled or otherwise removed from the container. As will be appreciated, this requires a labor intensive effort resulting in the waste of valuable time in a highly competitive market. Moreover, forcible removal of the broken fastener frequently results in the hole through which the fastener is inserted to become enlarged, thus, adversely effecting the holding ability of the replacement fastener used to secure a replacement nameplate to the container.

Thus, there is a continuing need and desire for a push-in type fastener requiring a relatively low insertion force and offering a relatively high retention force after the fastener is inserted into an opening or hole in an article while providing for quick and easy non-destructive removal of the fastener.

SUMMARY OF THE INVENTION

In view of the above, and in accordance with the present invention, there is provided a push-in type fastener which solves the heretofore known problems associated with these type fasteners. The fastener of the present invention has an enlarged head and a shank. The fastener is configured to allow the shank to be pushed through a complementary shaped aperture or opening in an article using a relatively low insertion force. A series of convolutions form a helical screw or rib formation on the fastener shank which opposes the fastener from being axially withdrawn from the article while readily permitting withdrawal of the fastener from the article in response to rotation of the fastener about its axis. Moreover, the fastener shank is configured to prevent inadvertent removal or separation of the fastener from the article through which it passes.

Preferably, the convolutions are configured such that the helical screw or rib formation on the fastener shank has an incomplete formation extending about the peripheral edge thereof. In one form, one or more convolutions comprising the helical screw or rib formation on the fastener shank are each configured with at least one recess or serration which opens to a crest diameter of the screw formation. An innermost edge of each recess or serration, however, preferably terminates radially outwardly from a root diameter of the respective screw or rib convolution. Besides resisting inadvertent rotation of the fastener about its axis, a threaded fastener shank so configured advantageously reduces fastener installation force by approximately twenty-five percent as comparted to fully threaded fasteners.

In another form of fastener, and besides configuring the fastener shank with a helical screw or rib formation, a pair of resilient wings or elements are joined and extend outwardly from opposed sides of the fastener shank free end. Each wing or element extends outwardly relative to the fastener axis a further radial distance than does the helical screw or rib formation on the fastener shank and, preferably, is inclined or slants toward the fastener head. Each wing or element is flexible in a direction toward the fastener head but is resistant to deflection in a direction away from the fastener shank whereby resisting inadvertent removal of the fastener from the opening in the article through which it passes. In a most preferred embodiment, guide structure is provided toward the free end of the threaded shank to facilitate self-centering of the threaded shank and the opening through which it is adapted to pass Regardless of the particular fastener shank structure utilized to resist inadvertent removal or separation of the fastener from the opening through which it passes, the terminal end of the fastener shank is preferably configured with a pilot. That is, the distal end of the fastener shank is preferably configured to facilitate insertion and alignment of the fastener shank relative to the hole or opening within which the shank is to be inserted.

The head of the fastener is configured to promote rotation of the fastener about the axis through use of a tool. In a preferred embodiment, the head of the fastener has a relatively low profile to benefit reduced clearance applications.

Additionally, the shank is joined to an underside of the fastener head across an area preferably having a cross-section equal to or greater than the crest diameter of the screw or rib formation.

Accordingly, one feature of the present invention involves the provision of a fastener of the above-described type which is of simple one-piece construction whereby permitting economical and mass production of the fastener.

Another feature of the present invention is to provide a push-in fastener which requires reduced insertion forces while offering relatively high axial retention forces and yet readily permits removal of the fastener as by turning about a fastener axis, thus, minimizing adverse impacts on the article or workpiece through which the fastener is inserted.

Still another feature of the present invention relates to providing a fastener easily insertable into an opening in an article and which can be removed and reused without loss of effectiveness while applying an advantageous retention force to reduce the likelihood of rattling.

Yet another feature of the present invention relates to the provision of a an affordable, push-in removable fastener which resolves the heretofore chronic broken fastener problem while yet securely retaining an article in place during use and handling.

These and other features, objects, aims and advantages of the invention will become more readily apparent from the following detailed description, appended claims, and accompanying drawings.

DETAILED DESCRIPTION OF THE DRAWINGS

FIG. 1 is an enlarged side view of one form of fastener according to the present invention;

FIG. 2 is a sectional view taken along line 2—2 of FIG. 1;

FIGS. 3 and 4 are fragmentary views showing alternative serration designs;

FIG. 5 is a top plan view of one fastener head design;

DETAILED DESCRIPTION OF THE INVENTION

Figure 6:
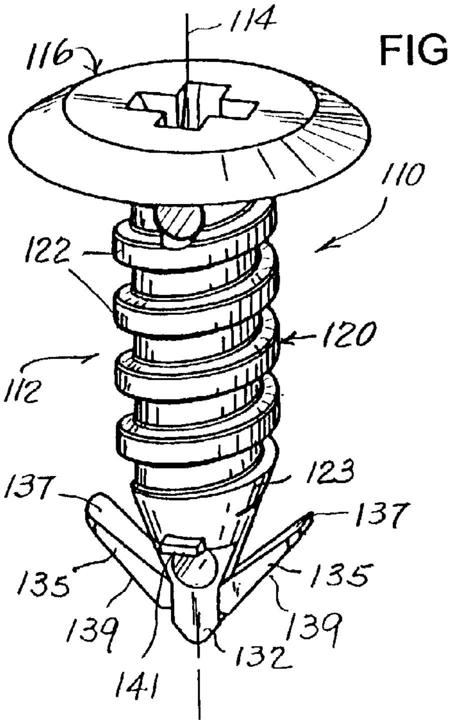
FIG. 6 is a perspective view of an alternative form of fastener according to the present invention.
Figure 7:
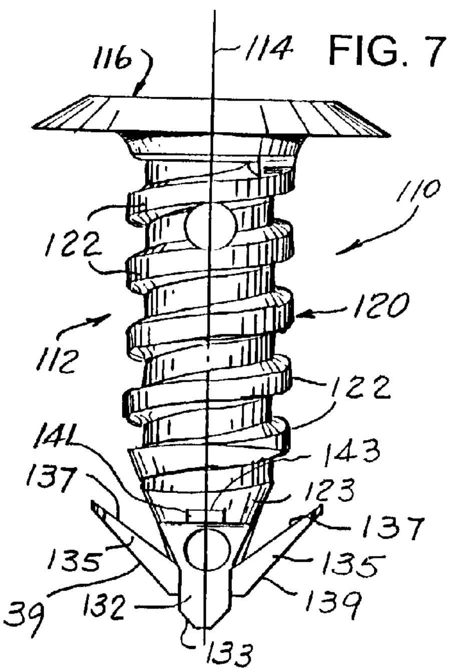
FIG. 7 is a side view of the fastener shown in FIG. 6.

While the present invention is susceptible of embodiment in multiple forms, there is shown in the drawings and will hereinafter be described preferred embodiments of the invention, with the understanding the disclosure is to be considered as setting forth exemplifications of the invention which are not intended to limit the invention to the specific embodiments illustrated and described.

Referring now to the drawings, wherein like reference numerals indicate like parts throughout the several views, in FIG. 1 there is shown one form of fastener, which embodies principals of the present invention, and is generally identified by reference numeral 10. Fastener 10 is preferably formed in one piece and comprises an axially elongated shank 12 defining an axis 14 for the fastener 10 and which depends from one side of an enlarged head 16. Fastener 10 can be injection molded from any of the polymeric resins, or plastic materials commonly used for the manufacture of these fasteners types and known by those of ordinary skill in the art. Nylon is but one example of a suitable material.

The fastener shank 12 is provided with a rib formation 20 comprised of a series of convolutions 22 which combine to provide the rib formation 20 with an aggressive helical thread form. The majority of convolutions extend 360° about the fastener shank 12 and radially away from the fastener axis 14.

As shown, the screw or rib formation 20 has an outer crest diameter 24 defining an outer diameter of the fastener shank 12. Moreover, the screw or rib formation 20 has an inner root diameter 26. As will be appreciated from an understanding of the present invention, and as shown in FIG. 1, the outer crest diameter 24 and inner root diameter 26 of the screw or rib formation 20 on the fastener shank 12 are sized relative to the complementary article or workpiece opening or aperture 30 through which the fastener 10 is configured to pass.

In the illustrated embodiment, the convolutions 22 along the length of the fastener shank 12 are substantially identical relative to each other and equally extend away from axis 14. Accordingly, in a preferred embodiment, the screw formation 20 and, thus, the fastener shank 12 has a substantially constant outer diameter along the length thereof.

The outer crest diameter 24 of the threaded formation 20 is sized slightly greater than the diameter of the article or workpiece hole or opening 30 through which fastener 10 passes. Moreover, the inner root diameter 26 of the threaded or rib formation 20 is sized slightly less than the diameter of the article or workpiece hole or opening 30 through which the fastener 10 passes.

In the exemplary embodiment, the free end of the fastener shank 12 opposite from the fastener head 16 has a pilot 32 configured to facilitate introduction of the fastener shank 12 into the article or workpiece hole or opening 30. In one form, the pilot 32 has a conically tapered shape preferably defining a generally round pointed end 34.

Notably, the fastener shank 12 is structured to prevent inadvertent removal of the fastener 10 from the article through which it passes. To accomplish such result, and in one form, the fastener shank 12 is configured to resist inadvertent turning or rotation of the fastener 10 about axis 14. As shown in FIGS. 1 and 2, one or more of the convolutions 22 forming the helical screw formation 20 on fastener shank 12 is configured with at least one recess or notch 36 opening to the crest diameter 24 of the respective convolution. Preferably, each convolution 22 forming the helical rib 20 is provided with at least one notch or serration 36 every 360 degrees about the crest diameter 24 of the respective convolution. Although the exemplary embodiment illustrates the notches or serrations 36 on the various convolutions 22 in generally vertically aligned relation relative to each other, it will be appreciated the notches or serrations 36 on the various convolutions 22 can be radially displaced relative to each other while accomplishing the same function and objective without detracting or departing from the spirit and scope of the present invention.

In a most preferred form, the majority of convolutions 22 forming the helical rib 20 are provided with a plurality of notches or serrations 36 spaced every 120 degrees or so about the outer edge or crest diameter 24 of the respective convolutions 22 comprising helical rib or thread 20. As shown in FIG. 2, a radial innermost edge 38 of each serration or notch 36 preferably terminates radially outwardly of the root diameter 26 of the helical thread or rib formation 30.

The notches or serrations 36 can take any of a myriad of different designs. One form of serration 36 is illustrated in FIG. 2. Alternative forms or designs for such serrations 36 are illustrated in FIGS. 3 and 4. It should be appreciated, the different designs of serrations 36 illustrated in FIGS. 2 through 4 are not intended to be exhaustive of all the possible serration designs but are merely examples of but a few serration designs which have proven useful in combination with the thread or rib formation 20.

In the illustrated embodiment, the convolutions 22 are joined to each other to form a continuous helically shaped rib or thread formation 20 extending about and along the fastener shank 12. Alternatively, the helical convolutions 22 can be configured such that a relatively narrow radial gap or opening can be provided between an ending portion of one convolution and a lead-in or beginning portion of an adjacent helical convolution. Yet the convolutions, when combined together, form a thread formation equivalent allowing the fastener shank 12 to be rotated about axis 14 and, thus, forcibly removed from opening 30 (FIG. 1) in the article. It should be appreciated, configuring the helically shaped rib or thread 20 from a series of individual but radially spaced helical convolutions will provide the peripheral edge of screw or rib 20 with an incomplete surface configuration functionally analogous to the serration 36 described above.

In the exemplary embodiment illustrated in FIG. 1, the fastener head 16 is larger in diameter than the fastener shank 12 and preferably has a generally round cross-sectional configuration whereby providing a generally circular and, preferably, planar shape to an engaging face 40 of the fastener head 16. It will be appreciated by those skilled in the art, however, fasteners, as contemplated by the present invention, can have a head with differing configurations from that shown without departing or detracting from the spirit and scope of the present invention. Moreover, and as shown in FIG. 1, the fastener head 16 is preferably configured with a relatively low vertical profile.

Fastener head 16 is furthermore configured to promote purposeful rotation of the fastener 10 about axis 14 as with a tool or the like. As shown in FIG. 5, the fastener head 16 preferably has a slotted configuration 44 to allow a tool T (FIG. 1) to be arranged in operable driving relation relative to the fastener 10. As will be appreciated, the slotted configuration 44 defined by the fastener head 16 can take any of a myriad of shapes and sizes other than that shown for exemplary purposes.

Returning to FIG. 1, the shank 12 of the fastener 10 is preferably joined to the head 16 across and area having a cross-section generally equal to or greater than the outer crest diameter of the helical rib 20. This design reinforces the head 16 and reduces the likelihood of breakage between the shank 12 and the head 16.

An alternative form of fastener is illustrated in FIGS. 6 through 9. The alternative form of fastener is designated generally by reference numeral 110. The elements of this alternative form of fastener that are identical or functionally analogous to the structure of fastener 10 discussed above are designated by reference numerals identical to those used above with the exception this embodiment of fastener uses reference numerals in the one-hundred series.

In this form, fastener 110 includes an axially elongated shank 112 defining an axis 114 and depending from one side of an enlarged head 116. The fastener shank 112 is provided with a rib formation 120 comprised of a series of convolutions 122 which combine to provide the rib formation 20 with an aggressive helical thread form. The majority of convolutions 122 extend 360° about the shank 112 and radially away from the fastener axis 114.

A free end of the fastener shank 112 opposite from the enlarged head 116 preferably has a frusto-conically shaped section 123 depending from the last helical screw convolution 122. In the embodiment shown in FIGS. 7 and 8, a narrowed elongated pilot 132 extends axially away from the free end of the fastener shank 112. In the exemplary embodiment, and as shown in FIG. 9, the pilot 132 has a generally rectangular cross-sectional configuration. Preferably, the pilot 132 has a tapered or chamfered extremity 133 to facilitate insertion of the fastener shank 112 into the hole or aperture accommodating the fastener 110.

Like fastener 10, fastener 110 is structured to prevent inadvertent separation or removal of the fastener 110 from the article through which it passes. In the exemplary embodiment, a pair of wings or elements 135 radially project to opposite sides of axis 114 for a distance exceeding the diameter of the bore or opening in the article through which fastener 110 is adapted to pass.

Each wing or element 135, in the exemplary embodiment, is configured to provide the fastener 110 with a cam-like lead-in to the aperture in the article into which it is inserted. As shown, each wing 135 is preferably provided with a first surface 137 extending outwardly from axis 114 and inclined toward the head 116 of the fastener 110 and a second tapered surface 139 extending outwardly and inclined toward the head 116. The wings or elements 135 are each inclined toward the fastener head 116 at generally the same angle ranging between about 25° and about 60° relative to a generally horizontal plane. In a most preferred embodiment, each wing 135 angles or is inclined toward the fastener head 116 at an angle of about 45° relative to a generally horizontal plane.

Each wing or element 135 is preferably formed integral with the fastener pilot 132. In a preferred form, each wing or element 135 is joined to the fastener pilot 132 along a relatively narrow and straight edge. Such connection provides a straight line hinge or bend point which facilitates ready flexing of the wings or elements 135 during insertion within the aperture or bore and flexure outwardly behind a surface of the article through which the fastener is inserted thereby preventing inadvertent axial removal of the fastener 110 from the article. The second or free end of each wing 135 preferably has a wider configuration than does the first end.

In this alternative fastener embodiment, the fastener shank 112 is furthermore preferably provided with guide structure to facilitate self-centering of the fastener shank 112 within the bore or opening in the article through which the fastener 110 is inserted. In the illustrated embodiment, such guide structure includes a pair of guide tabs 141 radially extending from opposite sides of axis 114 and preferably formed integral with the fastener shank 112.

In a most preferred form, the guide tabs 141 are disposed in diametrically opposed relation relative to each other and extend outwardly from that end of fastener section 123 disposed closet to the free end of the fastener shank 112. As viewed in FIGS. 7 and 9, the guide tabs 141 are preferably shown radially disposed between the wings or elements 135 on the fastener shank 112. As shown, each guide tab 141 preferably includes a first surface 143 extending outwardly and toward the head 116 of the fastener 110 and a second tapered surface 145 extending outwardly and toward the head 116 to provide fastener 110 with a self-centering function as it is inserted into the aperture in the article.

Figure 8:
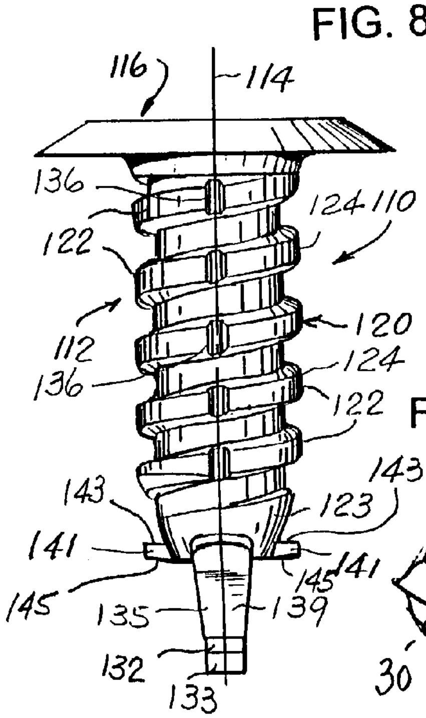
FIG. 8 is another side view of the fastener shown in FIG. 6.
Figure 9:
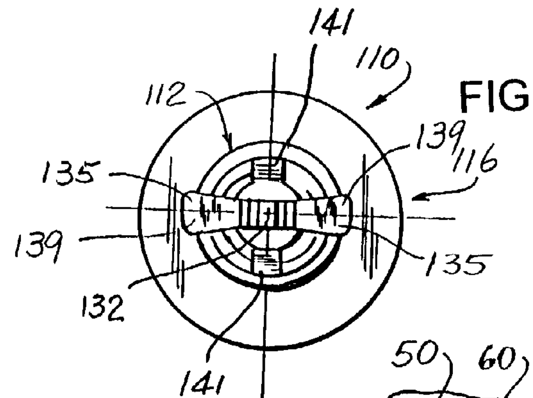
FIG. 9 is a bottom plan view of the fastener shown in FIGS. 7 and 8.

As shown in FIG. 8, and although not necessarily required to inhibit inadvertent axial removal of the fastener 110, one or more of the convolutions 122 forming the helical screw formation 120 on fastener shank 112 can each be configured with at least one recess or notch 136 opening to the crest diameter 124 of the respective convolution. The notches or serrations 136 formed on the helical screw formation 120 can be like those described above.

Figure 10:
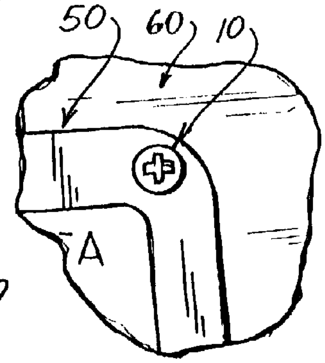
FIG. 10 is an elevational view showing the fastener of the present invention used to secure a panel to a container.

Fasteners according to this invention are versatile and can be used in a variety of different places and find multiple uses. For example, and as shown in FIG. 10, fasteners of the type described above are particularly useful to secure a panel or nameplate 50 to a container 60.

Figure 11:
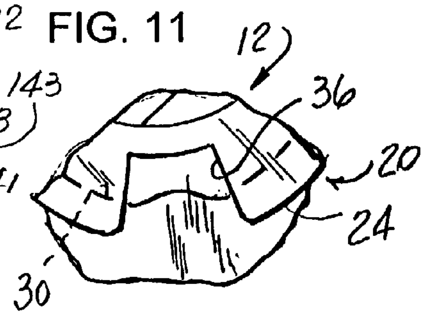
FIG. 11 is an enlarged plan view of a serration on an outer edge of a fastener shank after the fastener is inserted through an opening in an article or panel.

Suffice it to say, the material into which fastener 10 is inserted is preferably a material, i.e., plastic, which is subject to cold flow characteristics. Moreover, the material from which the fastener is formed is preferably harder than the material into which the fastener is to be inserted. As such, and as schematically illustrated in FIG. 11, the softer material surrounding the fastener and through which the fastener shank passes will tend to cold flow, over time, at least partially between opposed sides of and into the opening defined by the serrations on the helical rib whereby inhibiting free rotation or turning of the fastener about its axis and, thus, resisting inadvertent removal of the fastener from the article through which it passes. Moreover, and without purposeful unscrewing of the fastener from the article, the wings or elements on the fastener shank are configured to resist inadvertent removal or separation of the fastener from the article but which resiliently deflect or bend to readily permit insertion of the fastener shank into and through the opening in the article.

It will be apparent to those skilled in the art, the instant invention contemplates an economical and simple push-in fastener that can be readily installed into an apertured panel or hole 30 with a relatively low insertion force while an axially directed removal force, far in excess of the insertion force, would be required to axially remove the fastener from such panel. Thus, superior retention is provided by the fastener of the present invention. Moreover, the elongated helical screw or rib formation on the fastener shank will accommodate and work well with a large range of panel or sheet thicknesses. Additionally, the helical screw or rib formation allows the fastener to be released as through a simple turning action. As such, the fastener design set forth above allows for reliable reuse of the fastener any number of times without any real loss of efficiency or effectiveness while reducing the likelihood the fastener will loosen as a result of shock or, vibration during rough conditions. Furthermore, the preferred low profile design of the fastener head promotes use of the fastener in reduced clearance applications.

From the foregoing it will be readily appreciated and observed that numerous modifications and variations can be effected without departing from the true spirit and scope of the novel concept of the present invention. It will be appreciated that the present disclosure is intended to set forth exemplifications of the present invention which are not intended to limit the invention to the specific embodiments illustrated. The disclosure is intended to cover by the appended claims all such modification and colorful variations as fall within the spirt and scope of the claims.

What is claimed is:

1. A fastening system comprising:

an article having a non-threaded aperture; and a fastener adapted for insertion through said non-threaded aperture of said article, said fastener including an enlarged head having a depending shank defining an elongated axis for said fastener, said shank having a series of convolutions extending along and thereabouts defining a helical screw formation configured to allow said shank wit said convolutions to be pushed in an axial direction through said non-threaded aperture defined by said article and yet permit withdrawal of said fastener from said article in response to rotation of said fastener about said axis, and wherein said shank includes structure to prevent inadvertent separation of said fastener from said article.

2. The fastening system according to claim 1 wherein said structure comprises a peripheral edge of said helical screw formation on the shank of the fastener having an incomplete formation extending thereabouts for inhibiting inadvertent rotation of said fastener within the opening defined by said article while facilitating axial insertion of said fastener through said opening defined by said article.

3. The fastening system according to claim 1 wherein said structure comprises a distal end of said shank including a pair of wings projecting outwardly from opposite sides of said shank, with each wing being joined to said shank at a first end and inclined toward the head of the fastener, and wherein each wing is resilient in the direction toward said head and adapted to engage a surface of the article through which the fastener passes to prevent inadvertent separation of the fastener therefrom.

4. The fastening system according to claim 1 wherein said head is configured to promote rotation of said fastener about said axis through use of a tool.

5. A fastening system comprising:

an article having a non-threaded aperture; and a plastic fastener adapted for insertion through said non-threaded aperture of said article, said fastener including a head and a shank, with said shank defining an elongated axis and having a series of convolutions which combine to define a helical screw formation sized and configured such that a relatively low level axial force is required to push said shank with said convolutions into and through the non-threaded opening in the article while a relatively high level force is required to axially remove the fastener shank from said article, and with said helical screw formation permitting said fastener to be rotated about said axis to effect purposeful removal of the fastener from said article, and wherein said shank includes structure to resist inadvertent removal of the fastener from the article.

6. The fastening system according to claim 5 wherein said helical screw formation has an inner root diameter and an outer crest diameter, and said structure comprises one or more of the convolutions of said helical screw formation having at least one serration opening to the outer crest diameter of said screw formation and extending toward the root diameter of said screw formation.

7. The fastening system according to claim 6 wherein a radial innermost edge of each serration terminates radially outwardly of the root diameter of the helical screw formation.

8. The fastening system according to claim 5 wherein said fastener head is configured to allow a tool to be arranged in operable driving relationship relative to the fastener.

9. The fastening system according to claim 5 wherein said structure comprises said shank further including elements extending radially outwardly from opposite sides of said shank, with each element being joined to said shank at a first end and inclined toward the head of the fastener, and wherein each element is resilient in the direction toward said head and adapted to engage a surface of the article through which the fastener passes to resist inadvertent withdrawal of the fastener therefrom.

10. The fastening system according to claim 5 wherein a distal end of said shank defines a pilot to facilitate insertion of said fastener into and through the opening in the article.

11. A plastic push-in fastener adapted for insertion through a non-threaded opening in an article, said fastener comprising:

a head portion; and a shank portion depending from one side of said head portion and defining an elongated axis for said fastener, said shank portion having a series of helically shaped convolutions extending outwardly away from said axis and along a lengthwise section of said shank portion, said convolutions defining an outer crest diameter and an inner root diameter, said outer crest diameter being sized slightly larger than a diameter of the opening in the article and said inner root diameter being sized slightly less than the diameter of the opening in the article, said convolutions being adapted to allow said fastener to be pushed in an axial direction into and through the non-threaded opening in the article, as well as to permit purposeful removal of the fastener from the article in response to rotation of said fastener about said axis, with said shank portion further including structure to resist inadvertent separation of said fastener from the article.

12. The fastener according to claim 11 wherein a distal end of the shank portion of said fastener is configured with a pair of resilient wings projecting outwardly from opposite sides of said shank portion, with each wing being joined to said shank portion at a first end and inclined toward said head portion, and which, following insertion of said shank portion through the opening in said article, is adapted to engage a surface on the article to resist inadvertent separation of the fastener from the article.

13. The fastener according to claim 12 wherein the shank portion of said fastener further includes guide structure for facilitating self-centering of the shank portion as the fastener is inserted through the opening defined by said article.

14. The fastener according to claim 13 wherein said guide structure on said shank portion comprises a pair of diametrically disposed guides projecting radially outwardly from said shank portion, with said guides being disposed in offset radial relation relative to the sides of said shank portion from which said wings project outwardly.

15. The fastener according to claim 12 wherein the wings are each inclined toward the head portion at generally the same angle ranging between about 25° and about 60° relative to a generally horizontal plane.

16. The fastener according to claim 11 wherein a majority of said series of helically shaped convolutions are joined to each other to form a helically shaped rib extending about and along the shank portion of said fastener.

17. The fastener according to claim 16 wherein said structure comprises a majority of the convolutions forming said helically shaped rib defining at least one serration opening to a peripheral edge of said rib.

18. The fastener according to claim 11 wherein said head portion is configured with a low profile.

19. The fastener according to claim 11 wherein said head portion is configured to promote rotation of said fastener about said axis through use of a tool.

20. The fastener according to claim 11 wherein said shank is attached to said one side of said head across an area having a cross-section equal to or greater than said outer crest diameter.

* * * * *